May 10, 1932.                B. W. ST. CLAIR                1,857,216
                      THERMIONIC MEASURING INSTRUMENT
                           Filed July 21, 1931

Inventor:
Byron W. St. Clair,
by Charles E. Fuller
His Attorney.

Patented May 10, 1932

1,857,216

UNITED STATES PATENT OFFICE

BYRON W. ST. CLAIR, OF LYNN, MASSACHUSETTS, ASSIGNOR TO GENERAL ELECTRIC COMPANY, A CORPORATION OF NEW YORK

THERMIONIC MEASURING INSTRUMENT

Application filed July 21, 1931. Serial No. 552,230.

My invention relates to apparatus for accurately measuring small voltages and is an improvement upon the invention disclosed and claimed in U. S. Letters Patent No. 1,760,597, granted to S. C. Hoare, and assigned to the same assignee as the present invention.

One object of my invention is to provide a sensitive measuring instrument responsive to both halves of an impressed unknown alternating current voltage wave.

Another object of my invention is to provide a single adjustment thermionic measuring instrument of increased sensitivity.

A further object is to provide a measuring instrument which requires a negligible amount of current for its operation.

The features of my invention believed to be novel and patentable will be pointed out in the claims appended hereto.

Figure 1:
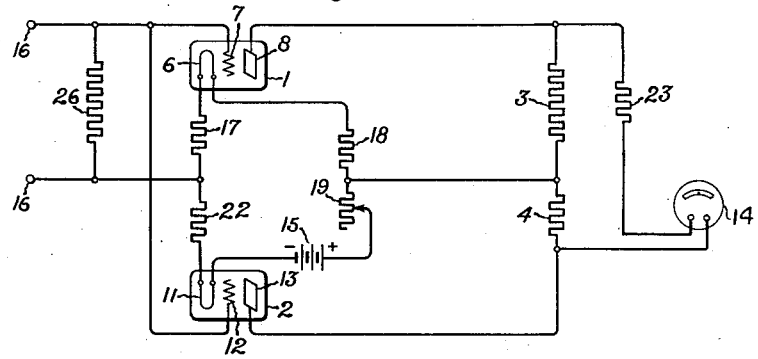
Figure 2:
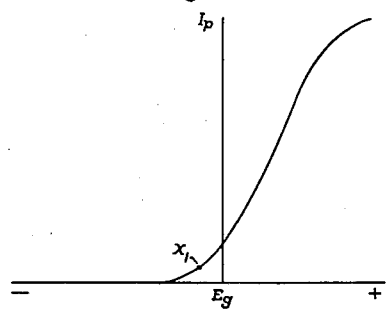
Figure 3:
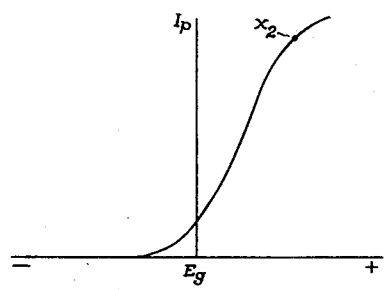
Figure 4:
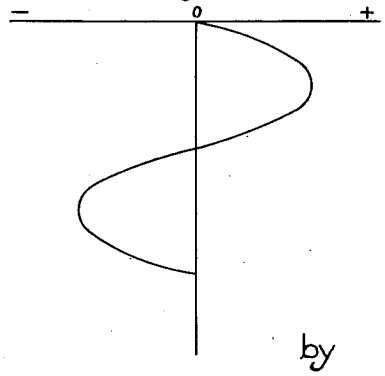

The present embodiment of my invention will now be described, reference being had to the accompanying drawings in which Fig. 1 shows the circuit diagram; Figs. 2 and 3 represent the characteristic curves of the instrument with tube 1 and tube 2 respectively in operation, and Fig. 4 represents an alternating current voltage wave; the last three figures being represented with filament voltages on the same vertical line.

The improved thermionic measuring device as shown in Fig. 1 comprises essentially two three-electrode tubes 1 and 2 having filament, grid and plate electrodes 6, 7, 8 and 11, 12, 13, respectively, a sensitive measuring instrument 14 associated with the plate circuits of the tubes, a battery 15 for supplying all circuits of the instrument, a variable resistance 19 for adjusting all grid, filament and plate potentials simultaneously, the terminals 16 across which the unknown voltage is impressed, and various resistance circuits interconnecting the parts as shown. For the purpose of illustrating a practicable combination, certain values of resistances will be hereinafter specified, but I desire to have it understood that the invention is in no way limited in this respect.

An inspection of Fig. 1 discloses that the elements of the instrument are connected in a Wheatstone bridge arrangement. The two thermionic tubes or electron discharge devices are in adjacent arms of the bridge which arms are balanced by the resistors 3 and 4 comprising the other two arms of the bridge. The measuring instrument 14 in series with the scale adjusting resistor 23 is connected between the plates of the tubes in shunt relation to the resistances 3 and 4, i. e., across the bridge. The battery 15 is the sole source of operating potential and the variable resistance 19 is the only means for adjusting the potential of the several electrodes. The filament heating circuit of the tubes may be traced from the positive terminal of the battery 15 through resistors 19, of about 25 ohms, and 18, of about 14 ohms, filament 6 of tube 1, resistances 17 and 22, each of about 5 ohms, filament 11 of tube 2 and then to the negative terminal of battery 15.

The plate circuit of tube 1 starting with the positive terminal of the battery 15 goes through the resistance 19, resistance 3 of about 4000 ohms, the plate 8, filament 6, resistances 17 and 22, filament 11 to the negative terminal of the battery. The plate circuit of tube 2 beginning with the positive terminal of battery 15 passes through resistance 19, resistance 4 of about 1000 ohms, the plate 13, filament 11 and then to the negative terminal of the battery. When the bridge is balanced and no voltage is impressed across the terminals 16, the drops in resistances 3 and 4 due to the current in the plate circuits are equal and opposite and there is no reading on the milliameter 14. Resistance 23 of about 800 ohms is chosen to give the desired scale reading of the instrument 14.

The drops through resistances 17 and 22 serve to bias the grids of the tubes, the resistance 26 of about 50,000 ohms serving to make possible the adjustment of the bias when no unknown voltage is connected across the terminal 16. The resistances 17 and 22 are chosen to make grid 7 negative and grid 12 positive relative to filaments 6 and 11 respectively when no unknown or test voltage is applied across the terminals 16.

Figs. 2, 3 and 4 are arranged to show graphically the principle of operation of the invention. The abscissæ $E_g$ of Figs. 2 and 3 represent the respective grid potentials with respect to filament potentials while the ordinates $I_p$ represent the plate currents. The points $x_1$ and $x_2$ (Figs. 2 and 3 respectively) represent the condition of tubes 1 and 2 respectively when the instrument is balanced and the milliameter 14 reads zero. At this time the plate currents are unequal but due to the difference in resistances 3 and 4 the bridge is balanced. The grids are at the same potential relative to each other but not with respect to their filaments. Figs. 2 and 3 are placed so that $x_1$ and $x_2$ lie on the same vertical line. The potential of the grids with respect to the filaments is read on the abscissa of each curve in the usual manner. Now, assuming an unknown alternating current voltage wave applied to the instrument by connecting its source across the terminal 16, it may be represented with its zero line lying along the line of $x_1$ and $x_2$; a single cycle of such wave is represented by Fig. 4. Neglecting the change in plate current below $x_1$ and above $x_2$ due to the proximity of these points to the zero and to the saturation point of the respective curves, it can be seen that the tube of Fig. 2 will respond to the positive half wave of the applied alternating current voltage and that the tube of Fig. 3 will respond to the negative half of the wave. Thus the impedance of one tube changes in accordance with negative impressed voltages and that of the other in accordance with positive impressed voltages; this results in greater unbalance of the Wheatstone bridge than is realized in the single tube instrument for a given value of impressed alternating current voltage.

For the purpose of measuring an unknown voltage the instrument is first calibrated by adjusting the resistance 19 until the milliameter 14 reads zero. When this adjustment has been made the potentials of the tube electrodes are all at their correct values, the constants of the circuits having been chosen in proper proportion for this condition. The unknown voltage to be measured is now impressed across the instrument terminals 16, and its magnitude is read directly on the instrument 14.

For most purposes the current taken by the resistance 26 is negligible or of no importance, however, measurements are required in some cases where it is required that a smaller current be drawn by the instrument. In such case the resistance 26 may be omitted and the device then draws only the small current of the grid and the capacitance current of the grid to adjacent parts of the instrument. When the resistance 26 is omitted in this manner it may be necessary to short circuit the terminals of the instrument during the balancing of the bridge. The circuit to be metered may serve the same purpose if the source of voltage is removed.

In accordance with the patent statutes, I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:

1. In a thermionic voltage measuring device, two electron discharge devices having filament, grid and plate electrodes, a filament heating circuit comprising grid biasing resistors between the filaments on one side, and a source of current, a variable resistance and a fixed resistance in series on the other side, a sensitive measuring instrument connected in shunt relation to a divided resistance between the plates of the tubes, the point of division of said divided resistance being connected to a point between the said fixed and said variable resistances in the filament heating circuit, and terminals for applying an unknown voltage to be measured, one connected to the grid electrodes and another to a point between the said grid biasing resistors.

2. In a thermionic voltage measuring device, two electron discharge devices having filament, grid and plate electrodes, a filament heating circuit comprising grid biasing resistors between the filaments on one side, and a source of current, a variable resistance and a fixed resistance in series on the other side, a sensitive measuring instrument connected in shunt relation to a divided resistance between the plates of the tubes, the point of division of said divided resistance being connected to a point between the said fixed and said variable resistances in the filament heating circuit, and terminals for applying an unknown voltage to be measured, one connected to the grid electrodes and another to a point between the said grid biasing resistors, and a high resistance connected between the said terminals.

3. In a thermionic voltage measuring device two electron discharge devices having filament, grid and plate electrodes, a resistance connected between the plate electrodes, a sensitive measuring means connected in shunt relation across the resistance, a filament heating circuit including the filament of one of said devices, a source of current, a variable resistance, a fixed resistance, the filament of the other of said devices and fixed resistances between the filaments connected in series in the order mentioned, means associated with said last named resistances whereby the grid electrode of one of said devices is biased to a negative potential with respect to its filament and the grid electrode of the other of said devices is biased to a positive potential with respect to its filament, and a connection between the juncture of the fixed and variable resistances in the filament circuit to a point in the first named resistance whereby potential is applied to the plate electrodes of the electric discharge devices.

4. In a thermionic voltage measuring device two vacuum tubes having filament, grid and plate electrodes, a filament heating circuit comprising a resistance joining the filaments on one side and a second resistance and means for applying a variable current joining the filaments on the other side, a sensitive voltage measuring means in shunt relation to a fixed resistance connected between the plate electrodes, a connection from a point in said fixed resistance to the juncture of the current applying means and the said second resistance, and terminals for applying an unknown voltage to be measured between the grid electrodes and a point in the first mentioned resistance.

5. In a Wheatstone bridge arrangement adapted to measure small voltages, two adjacent bridge arms each including an electron discharge device having a cathode, an anode and a control electrode, means associated with the control electrodes for biasing one of said control electrodes to a positive potential relative to its associated cathode and the other control electrode to a negative potential relative to its associated cathode, input terminals for applying to the control electrodes an unknown voltage to be measured, a sensitive measuring instrument connected between the anodes of the said electric discharge devices whereby said instrument is responsive to both halves of an applied alternating current voltage wave.

6. A thermionic voltage measuring device including a Wheatstone bridge arrangement having two adjacent arms each including variable impedance elements, said elements comprising electron discharge devices each having a cathode, an anode and a control electrode, the anodes being connected together through the other two adjacent arms of the bridge, a sensitive measuring instrument connected across said other arms, means biasing one of said control electrodes positively with respect to its cathode and the other negatively with respect to its cathode, and input means whereby a positive input potential will vary one of said impedance elements and a negative input potential will vary the other of said elements.

7. In a thermionic voltage measuring device, two electron discharge devices each having an anode, a cathode and a control electrode, the anodes being connected together through a divided resistance, a sensitive measuring instrument in shunt relation to said resistance, a single source of direct current, connecting means associated with said source for heating the cathodes, a second connecting means associated with said source for applying potential to the anodes, a third connecting means associated with said source whereby the control electrode of one of said devices is given a positive bias with respect to its cathode and the control electrode of the other device is given a negative bias with respect to its cathode, and terminals associated with said third means whereby an unknown voltage may be impressed upon the measuring device.

8. A thermionic measuring instrument comprising a Wheatstone bridge, two arms of which comprise electron discharge devices each having filament, grid and plate electrodes, a source of supply connected in series relation with both filaments for supplying heating current thereto, said circuit including resistances one of which is adjustable, connections from suitable points in said heating circuit for supplying a plate and grid potentials to said discharge devices such that when the variable resistance is properly adjusted for the correct filament heating current the potentials applied to the other electrodes are such as to balance the bridge.

In witness whereof I have hereunto set my hand.

BYRON W. ST. CLAIR.